(12) United States Patent
Curcio et al.

(10) Patent No.: US 10,785,130 B2
(45) Date of Patent: Sep. 22, 2020

(54) NETWORK INFRASTRUCTURE DEVICE TO IMPLEMENT PRE-FILTER RULES

(71) Applicant: Hewlett Packard Enterprise Development LP, Houston, TX (US)

(72) Inventors: Joseph A. Curcio, Folsom, CA (US); Bruce E. LaVigne, Roseville, CA (US); Wei Lu, Austin, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 167 days.

(21) Appl. No.: 15/565,810

(22) PCT Filed: Apr. 23, 2015

(86) PCT No.: PCT/US2015/027259
§ 371 (c)(1),
(2) Date: Oct. 11, 2017

(87) PCT Pub. No.: WO2016/171691
PCT Pub. Date: Oct. 27, 2016

(65) Prior Publication Data
US 2018/0115471 A1    Apr. 26, 2018

(51) Int. Cl.
*H04L 29/08* (2006.01)
*H04L 12/26* (2006.01)
(Continued)

(52) U.S. Cl.
CPC ........ *H04L 43/028* (2013.01); *H04L 47/2441* (2013.01); *H04L 47/31* (2013.01);
(Continued)

(58) Field of Classification Search
CPC .................................................. H04L 43/028
See application file for complete search history.

(56) References Cited

U.S. PATENT DOCUMENTS

| | | | |
|---|---|---|---|
| 8,291,495 B1 | 10/2012 | Burns et al. | |
| 2007/0011734 A1* | 1/2007 | Balakrishnan | H04L 43/026 726/13 |

(Continued)

FOREIGN PATENT DOCUMENTS

KR    10-2011-0039498 A    4/2011

OTHER PUBLICATIONS

Hess, A. et al, Intelligent Distribution of Intrusion Prevention Services on Programmable Routers, Apr. 2006, 11 Pgs.
(Continued)

*Primary Examiner* — Adnan M Mirza
(74) *Attorney, Agent, or Firm* — Hewlett Packard Enterprise Patent Department

(57) ABSTRACT

Example embodiments disclosed herein relate to implementing pre-filter rules at a network infrastructure device. In one example, the network infrastructure device receives a packet flow including a first pre-filter tag including information from implementation of a first subset of a set of pre-filter rules. In the example, the network infrastructure device includes logic to implement a second subset of the pre-filter rules. The second subset of pre-filter rules are different from the first subset of pre-filter rules. The second subset of pre-filter rules are implemented on the packet flow to yield a pre-filter result.

16 Claims, 4 Drawing Sheets

(51) Int. Cl.
  *H04L 12/833*   (2013.01)
  *H04L 29/06*    (2006.01)
  *H04L 12/851*   (2013.01)
  *H04L 12/721*   (2013.01)
  *H04L 12/813*   (2013.01)

(52) U.S. Cl.
  CPC ...... *H04L 63/0227* (2013.01); *H04L 63/0245* (2013.01); *H04L 63/0263* (2013.01); *H04L 63/1408* (2013.01); *H04L 63/1441* (2013.01); *H04L 45/38* (2013.01); *H04L 47/20* (2013.01)

(56) References Cited

U.S. PATENT DOCUMENTS

| | | | |
|---|---|---|---|
| 2009/0016226 A1* | 1/2009 | LaVigne | H04L 63/1408 370/241 |
| 2010/0088756 A1 | 4/2010 | Balakrishnan et al. | |
| 2011/0099631 A1 | 4/2011 | Willebeek-LeMair et al. | |
| 2011/0141924 A1 | 6/2011 | Froehlich et al. | |
| 2012/0218901 A1* | 8/2012 | Jungck | H04L 29/12066 370/241 |
| 2013/0003735 A1 | 1/2013 | Chao et al. | |
| 2013/0136011 A1 | 5/2013 | Tardo et al. | |
| 2014/0153435 A1 | 6/2014 | Rolette et al. | |
| 2014/0269299 A1 | 9/2014 | Koornstra | |
| 2014/0325649 A1 | 10/2014 | Zhang | |
| 2014/0380466 A1 | 12/2014 | Schultz et al. | |

OTHER PUBLICATIONS

International Searching Authority, The International Search Report and the Written Opinion, dated Jan. 22, 2016, PCT/US2015/027259, 12 Pgs.

* cited by examiner

NETWORK INFRASTRUCTURE DEVICE TO IMPLEMENT PRE-FILTER RULES

BACKGROUND

Computing networks can include multiple network devices such as routers, switches, hubs, servers, desktop computers, laptops, workstations, network printers, network scanners, etc. that are networked together across a local area network (LAN), wide area network (WAN), wireless networks, etc. Networks can include deep packet inspection devices, such as an intrusion prevention system (IPS) and/or an intrusion detection system (IDS) to detect unwanted activity acting on the computer network.

BRIEF DESCRIPTION OF THE DRAWINGS

The following detailed description references the drawings, wherein.

DETAILED DESCRIPTION

Figure 1:
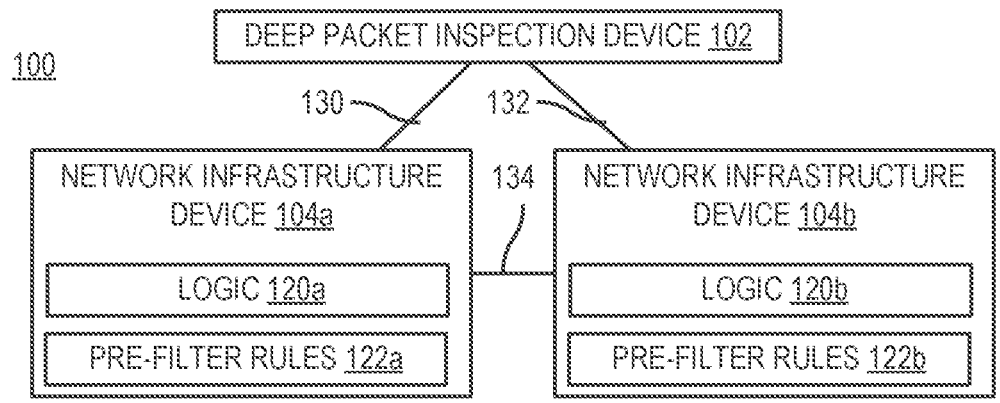
FIG. 1 is a block diagram of a network system including two network infrastructure devices capable of implementing different pre-filter rules on packets, according to an example.

The set of possible malware (e.g., viruses, worms, spyware, etc.) signatures and signatures of other interesting patterns of network traffic is ever-increasing. Thus, a large quantity of rules may be implemented to detect the patterns (e.g., malware). Deep Packet Inspection devices can examine network packets and flows of packets to detect the patterns, for example, to help defend against malware. However, deep packet inspection devices tend to be slow relative to current network speeds, with the performance gap widening. Increasing deep packet inspection device capacity, and/or capability, to check all network data is expensive. Examples of deep packet inspection devices include Intrusion Detection Systems (IDS), Intrusion Prevention Systems (IPS), and Next Generation Firewalls (NGFW).

One option is to pre-filter the traffic according to rules to determine whether deep packet inspection should be applied. Pre-filtering is an approach to select packets (e.g., flows of packets) to send to a network appliance such as a deep packet inspection device if the packets meet criteria (e.g., if the packets are suspicious or in some other way interesting to the inspection device). Thus, packets and/or packet flows can be sent or not sent to the deep packet inspection device based on the pre-filtering. Advantageously, deep packet inspection need not be performed on each packet on the network. On a campus network, which is a computer network made up of an interconnection of Local Area Networks (LANs) within a geographical area, network traffic may travel through multiple network infrastructure devices (e.g., switches, routers, wireless access points, etc.) to go from a source to a destination. With the growing quantity of rules increasing, it can be desirable to scale the approach to use these network infrastructure devices.

Accordingly, various embodiments disclosed herein relate to using network infrastructure devices to implement different subsets of rules that may be implemented to detect malware or other traffic identification. When a flow of packets travels from a source to a destination, a first network infrastructure device can tag packets with the information determined from rule implementation of a first subset of rules that the first network infrastructure device uses. In certain examples, implementation of a rule can mean the application and/or execution of the rule. The first network infrastructure device can then pass the packets to a second network infrastructure device, which can perform additional pre-filtering with a second set of rules. The second subset of rules can include additional pre-filtering rules compared to the first subset of rules. The tagged information can be used by the second network infrastructure device as well as further network infrastructure devices in the packet flow to make decisions about the packet flow (e.g., to send the packet flow to a deep packet inspection device, intelligently choosing an intermediate network infrastructure device to route the packet flow's path through to implement particular pre-filter rules, etc.).

According to various examples, a list of pattern signatures is processed to arrive at a set of rules. The rules can signify that a particular pattern is present in a packet or packet flow. A rule can be considered matched if the pattern associated with the rule exists in the packet or packet flow being examined. In some examples, if a particular rule is matched, the packet flow is directed towards a deep packet inspection device for further inspection. In other examples, multiple rules can be matched to determine that a flow should be directed to the deep packet inspection device for further inspection. The network infrastructure device can tag the packets in the flow with information determined from implementation of the rules. In one example, the rules can be applied as executable instructions executed by a processor. In another example, the rules can be applied in hardware as discussed below. In another example, implementation of the rules can mean validating against the rules. The tag can be placed in a header of the packets and can be read by other network infrastructure devices. Thus, a second network infrastructure device can look at a tagged packet and know that a particular rule was matched in a previous processing of the packet. The second network infrastructure device can also know that a second rule that the second network infrastructure device implemented also matched. The combination of these two matched rules can signify that further inspection should be performed by a deep packet inspection device.

Even though various examples discussed herein relate to patterns of malware, other types of patterns can be searched for. Examples of these patterns include patterns signifying an application running, transactions, particular messages, particular content (e.g., copyrighted works), etc.

The rule set can be configured to be conservative so as not to miss packets that include malware such as viruses. As such, the approach may also select packets which are not part of malware to be further inspected. The intention is to find flows of packets that may be suspicious because particular patterns have been found. Further inspection from a deep packet inspection device can be performed to determine whether the activity is malicious.

Some portion of the full rule set can be scanned for in hardware of the network infrastructure devices (e.g., switch hardware). As noted, the rules can be split between multiple network infrastructure devices to enable scaling compared to attempting to perform all of the rules on a single network infrastructure device.

As used herein, a network infrastructure device includes a network chip and can be used to forward packets. In one example, the network infrastructure device can have a number of network ports for the device for receiving and transmitting packets therefrom, and logic that is encoded with application specific integrated circuit (ASIC) primitives to check header fields and payload content in the packets. In other examples, logic can be implemented using other electronic circuitry (e.g., field programmable gate arrays (FPGAs), complex programmable logic devices (CPLDs), etc.), instructions executable by a processor, etc. In certain examples, the logic can perform pattern matching on the header fields and the payload content, such as according to a number of rules included in a subset of rules from among all rules offered in association with a checking functionality.

FIG. 1 is a block diagram of a network system including two network infrastructure devices capable of implementing different pre-filter rules on packets, according to an example. The network system 100 can include a deep packet inspection device 102 that communicates with devices via a communication network. The communication network can include network infrastructure devices 104a and 104b. In some embodiments, the network infrastructure devices 104a, 104b can include special purpose machines. Further, according to some examples, the deep packet inspection device 102 and/or the network infrastructure devices 104a, 104b can be implemented via a processing element, memory, and/or other components such as ASICs. The network infrastructure devices 104a, 104b can include logic 120a, 120b. Part of the logic 120a, 120b can be used to implement pre-filter rules 122a, 122b.

As used herein, the term deep packet inspection device 102 is used to mean a network appliance or an add-on device, e.g., plug-in or application module or device, to a network with checking functionality as contrasted with a "network infrastructure device" 104, e.g., router, switch, access point, and/or hub, etc., which are sometimes considered more as "backbone" component devices to a network. A checking functionality can be provided in the form of software, application modules, ASIC logic, and/or executable instructions operable on the systems and devices shown herein or otherwise.

The packets can be determined to be network packets of interest based on pre-filtering applied by network infrastructure devices 104. As noted above network infrastructure devices 104 include a network chip and can be used to forward packets. In one example, the network infrastructure device 104 can have a number of network ports for the device for receiving and transmitting packets therefrom, and logic 120 that is encoded with ASIC primitives and/or other logic to check header fields and/or payload content in the packets. In certain examples, the logic 120 can perform pattern matching on the header fields and the payload content, such as according to a number of rules included in a subset of rules from among rules offered in association with a checking functionality such as a deep packet inspection device.

In certain examples, the logic 120 can be used to match patterns in the packets and/or packet flow according to the pre-filter rules 122. The patterns can be byte patterns and/or packet patterns and/or regular expression patterns. The logic can look for stateful patterns, "stateful" in that patterns can be detected across packet boundaries (e.g., a pattern can extend across packets). Packet(s) matching pattern(s) are deemed to satisfy the rule. In an example, the pre-filter rules 122 can be based on at least one Bloom filter. A Bloom filter can be used to test whether an element (e.g., a byte pattern from packet(s)) is a member of a set (e.g., interesting byte patterns). In another example, the pre-filter rules 122 can be based on a regular expression filter. A regular expression filter searches for byte patterns in the packets using regular expressions. In another example, the pre-filter rules 122 can be based on a packet order tracker that tracks ordering of packets (e.g., the order of packets in a Transmission Control Protocol (TCP) stream). In another example, the pre-filter rules can be based on a packet size tracker that searches for packets that match suspicious packet sizes. The pre-filter rules can include any combination of such examples, in addition to like type byte pattern and/or packet pattern matching.

Network infrastructure device 104a can be used to forward network packets on a network. Network infrastructure device 104b can also be used to forward network packets on the network. In some examples, packets can flow through network infrastructure device 104a, network infrastructure device 104b, or a combination thereof. As noted above, multiple sets of pre-filter rules 122 can be used in network system 100. As such, pre-filter rules 122a can be different from pre-filter rules 122b. In some examples, the sets of pre-filter rules can be mutually exclusive. In other examples, the sets of pre-filter rules can overlap.

The packets can be inspected at logic 120a to identify packet flows from a source to a destination that match a pre-filter rule or multiple pre-filter rules. If a rule matches, the packet and/or packet flow can be tagged with the information. In certain examples, if rules do not match, that information is included (e.g., rules A, B, and C were implemented for, but did not match).

In one example, the network infrastructure device 104a can further determine whether the packet flow should be sent to the deep packet inspection device 102 for further scrutiny, to another network infrastructure device 104a for implementation of additional pre-filter rules 122b, and/or clear the flow to travel from the source to the destination. In one example, a match of a single rule can represent that further scrutiny should be applied. As such, the packet flow including the packets can be sent to the deep packet inspection device 102 for further scrutiny. In another example, a match of a rule may indicate that another set of rules should be implemented to determine whether the flow should be further scrutinized by a deep packet inspection device 102.

The deep packet inspection device 102 can perform the further scrutiny (e.g., deep packet inspection) and determine whether the flow is clear of the malware signatures searched for or include the malware signatures searched for. In one example, the malware signatures are not present and the flow can be cleared to travel from the source to the destination. In some examples, this information can be tagged to the flow and network infrastructure devices 104 can choose not to implement the logic 120 on the cleared flows. In another example, deep packet inspection device 102 can determine that the flow matches a malware signature according to a rule. In this example, a security action can be performed. The security action can include blocking a packet or multiple packets of the flow, block the flow, log in the occurrence for metrics, send a message for indicating that the match occurred, sending to another deep packet inspection device for further analysis (e.g., redirecting the flow to monitor for security analysis), etc.

The deep packet inspection device 102 and network infrastructure devices 104a, 104b can be part of a communication network. The communication network can use wired communications, wireless communications, or combinations thereof. Further, the communication network can include multiple sub communication networks such as data networks, wireless networks, telephony networks, etc. Such networks can include, for example, a public data network such as the Internet, local area networks (LANs), wide area networks (WANs), metropolitan area networks (MANs), cable networks, fiber optic networks, combinations thereof, or the like. In certain examples, wireless networks may include cellular networks, satellite communications, wireless LANs, etc. Various communications structures and infrastructure can be utilized to implement the communication network(s).

By way of example, the devices can communicate with each other and other components with access to the communication network via a communication protocol or multiple protocols that define how nodes of the communication network interact with other nodes. Further, communications between network nodes can be implemented by exchanging discrete packets of data or sending messages. Packets can include header information associated with a protocol (e.g., information on the location of the network node(s) to contact, time stamp, identifier of the protocol, other supplemental information, combinations thereof etc.) as well as payload information.

Although not shown, the connections 130, 132, 134 between the devices can include other devices, such as other network infrastructure devices. Moreover, in some examples, some of these other network infrastructure devices can include logic to implement pre-filter rules described herein. In other examples, some of the other network infrastructure devices may not include the logic to implement pre-filter rules. Further, in some examples, tags including pre-filter information may be passed through the other network infrastructure devices. These tags may be in the form of additional headers which the other network infrastructure devices ignore.

Figure 2:
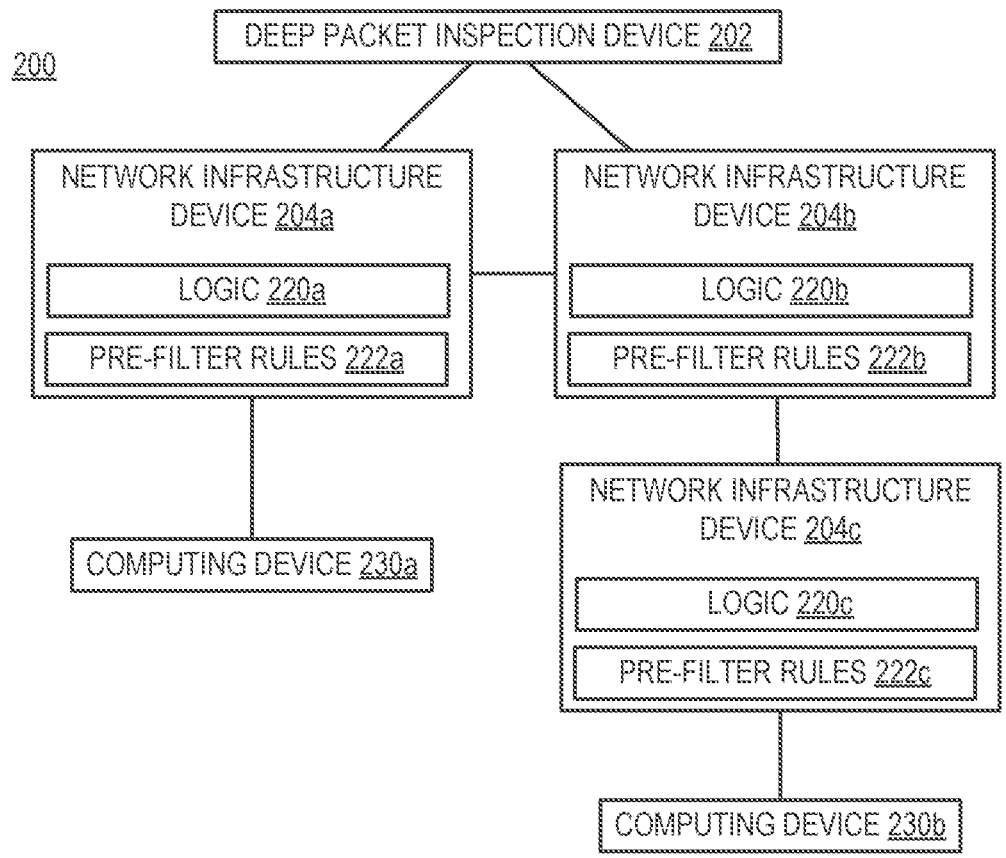
FIG. 2 is a block diagram of a network system including multiple network infrastructure devices capable of implementing pre-filter rules on packets, according to an example.

FIG. 2 is a block diagram of a network system including multiple network infrastructure devices capable of implementing pre-filter rules on packets, according to an example. The network system 200 can include a deep packet inspection device 202 that communicates with devices via a communication network. Further, network system 200 may be implemented as part of a campus network that can be connected to other networks (e.g., the Internet). The communication network can include network infrastructure devices 204a, 204b, 204c. In some examples, the network infrastructure devices 204a, 204b, 204c can include special purpose machines such as switches, routers, access points, hubs, etc. Further, according to some examples, the deep packet inspection device 202 and/or the network infrastructure devices 204a, 204b, 204c can be implemented via a processing element, memory, and/or other components. The network infrastructure devices 204a, 204b, 204c can include logic 220a, 220b, 220c. Part of the logic 220a, 220b, 220c can be used to implement pre-filter rules 222a, 222b, 222c.

For the purpose of a simple explanation, in one example, pre-filter rules 222a may include rule sets A, B, and C, pre-filter rules 222b may include pre-filter rules D, E, and F, and pre-filter rules 222c may include pre-filter rules G, H, and I. In this example, the following rule combinations can be indicative of scenarios where further scrutiny should be conducted by the deep packet inspection device 202 {A, BC, BE, BDG, CH, EH}.

In one example, a packet flow can go from a first computing device 230a to a second computing device 230b. Network infrastructure device 204a receives the packets in the flow. The logic 220a can be implemented to determine results. The results can be tagged to the packet flow (e.g., as part of a header). For example, if a rule matches, the information can be tagged to the packet flow and/or if a rule does not match, information that the rule was checked, but not matched can be tagged.

In one example, if rule A and/or rules B and C are matched, the network infrastructure device 204a can identify the packets of the flow as to be forwarded to the deep packet inspection device 202 for further scrutiny. The network infrastructure device 204a can then forward the packets to the deep packet inspection device 202 on its way to computing device 230b.

In another example, the logic 220a determines that rule B was matched and tags the information to the packet flow. When the network infrastructure device 204a forwards the packet flow to network infrastructure device 204b, logic 220b can check against rules D, E, and F. The results can be tagged to the packet flow. Further, the network infrastructure device 204b can know that the rule B was matched by reading the tag in the packet flow. In this example, the logic 220b can identify the packets of the flow as to be forwarded to the deep packet inspection device 202 for further scrutiny if rule E is matched because then the rule combination of B and E is known to be matched. In another example, if D is matched, that information can be tagged and the flow can be forwarded to network infrastructure device 204c. Logic 220c can implement rules 222c on the packets and tag results into the packet flow. Moreover, if rule G is matched, then the packet flow can be forwarded to the deep packet inspection device 202 based on a match to rules B, D, and G via multiple pre-filtering tiers. Similarly, if rules C and H were both matched for the same packet flow or E and H were both matched for the same packet flow, the flows would be sent to the deep packet inspection device 202 for further scrutiny.

In separate example, the flow is initially set to go towards the deep packet inspection devices 202. In this example, the flow can go from computing device 230b to computing device 230a. In a simple example, network infrastructure device 204c implements rules {A, B, C}, another network infrastructure device 204b in the path implements rules {D, E, F}. In this example, the following rule combinations can indicate that further scrutiny should be conducted by a deep packet inspection device 202 {AB, BF, CD}.

In one example, the flow matches rules B and C at network infrastructure device 204c, is tagged, and goes to network infrastructure device 204b on its path to a deep packet inspection device 202. In one example, network infrastructure device 204b can match rule D. In this example, the information is tagged to the flow and the flow is sent to the deep packet inspection devices 202 because the flow matches rules C and D.

In another example, the flow matches rules B and C at network infrastructure device 204c, is tagged, and goes to network infrastructure device 204b on its path to a deep packet inspection device 202. In this example, network infrastructure device 204b can match rule E or not match any additional rules from matched rules B and C. Further, in this example, the information can be tagged to the flow and the flow can be redirected to the computing device 230a via network infrastructure device 204a because match criteria indicating that deep packet inspection should be performed on the flow cannot be fulfilled. The examples above are simple examples for explanatory purposes. An X number of rules can be implemented in various combinations among a Y number of network infrastructure devices. Moreover, a Z number of rule combinations signifying packet flows to further scrutinize can be used. Further, some of the network infrastructure devices can implement logic with pre-filter rules while other network infrastructure devices may not.

Moreover, in some examples, classifications of network traffic traveling through particular network infrastructure devices, for example, network infrastructure device 204c, can be associated with the network infrastructure device 204c and associated with the pre-filter rules 222c implemented on the network infrastructure device. In one example, the network infrastructure device 204c is directly in between a set of computing devices (e.g., computing device 230b) and the other components in the network. In this example, the classification of the computing devices and/or network activity associated with the computing devices can be used to choose pre-filter rules specific to the clients. For example, if the computing devices were all user devices, rules affecting server devices need not be implemented on packet flows going to or from the computing devices. Examples of classes of network activity may include server network activity, desktop network activity, mobile device network activity, etc. The network activity can be associated with the respective device types. In other examples, other types of classifications may be used, for example, the type of operating system(s) implemented by the devices, types of applications implemented, etc. As such, classifications can be based on criteria that can be used to select rules to implement. Moreover, in another example, a set of network infrastructure devices may similarly be between the set of clients and the other components of the network.

Further, in another example, the pre-filter rules can be distributed to the network infrastructure devices based on network topology. For example, edge devices of a campus network may include a first set of pre-filter rules and non-edge devices of the campus network may include a second set of pre-filter rules. In other examples, the edge devices may further implement rules based on rules associated with classes of network traffic associated with computing devices connected to the edge device.

Figure 3:
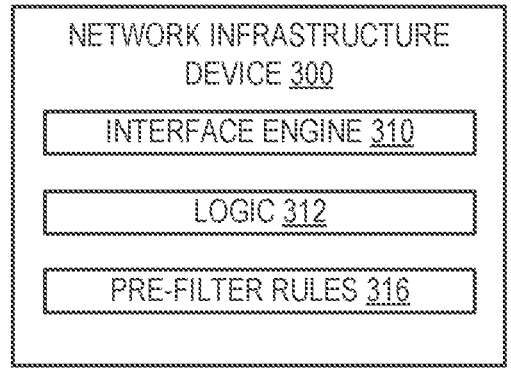
FIGS. 3 and 4 are a block diagrams of network infrastructure devices capable of tagging implemented pre-filter rules, according to an example.
Figure 4:
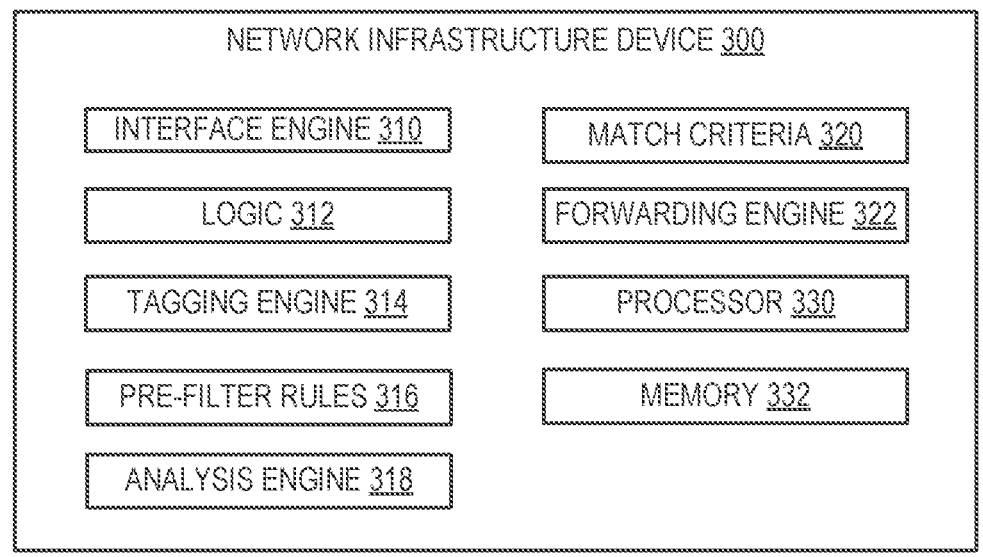

FIGS. 3 and 4 are a block diagrams of network infrastructure devices capable of tagging implemented pre-filter rules, according to an example. In one example, the network infrastructure device 300 includes an interface engine 310, logic 312, and pre-filter rules 316. In another example, the network infrastructure device 300 can further include a tagging engine 314, an analysis engine 318, match criteria 320, a forwarding engine 322, a processor 330, and/or memory 332.

Interface engine 310 can be used to communicate with other devices. For example, the interface engine 310 can be used to communicate with devices via a network such as other network infrastructure devices, clients, deep packet inspection devices, a software defined network (SDN) controller, etc. In one example, the interface engine 310 can be used to receive packets. The packets can be part of a packet flow from a source device to a destination device. As discussed above, the packet flow can be tagged with results information from implementation of one or more sets of pre-filter rules implemented by other network infrastructure devices. The network infrastructure device 300 can be part of a campus network that includes multiple other network infrastructure devices. The packet flow can be received (either directly or indirectly) from one of the other network infrastructure devices.

Logic 312 can be configured to implement pre-filter rules 316 on packets. The pre-filter rules 316 can be a subset of a complete set of pre-filter rules. Further, the pre-filter rules 316 can be different from the pre-filter rules previously implemented. The tagging engine 314 can be used to tag the packet flow with a pre-filter tag including a pre-filter result from implementation of the pre-filter rules 316. The tag can be implemented as part of a header to the packets, packet flow, etc. In certain examples, the header can be configured to be read by network infrastructure devices compatible with implementing logic to implement pre-filter rules and can be ignored by other network infrastructure devices.

Analysis engine 318 can be used to analyze the pre-filter tags in the packet flow and the pre-filter result to determine whether the packet flow is to be further scrutinized by a deep packet inspection device and/or other network infrastructure device capable of implementing pre-filter rules. The determination can be based on match criteria 320. In certain examples, match criteria 320 is a data structure that includes a set of pre-filter rules or combination of pre-filter rules that, if matched, indicate that the packet flow should be further scrutinized. The match criteria 320 can include, for example, a list of the matched rule combinations, a regular expression indicating the matched rule combinations, etc. If the match criteria 320 is satisfied, the packet flow can be marked as to be further scrutinized and can be forwarded, via the forwarding engine 322, to the deep packet inspection device. The path to the deep packet inspection device can include other network infrastructure devices. In one example, the pre-filter result can be accounted for after the tag is added. In another example, the pre-filter result can be accounted for before or in parallel with the tagging. The deep packet inspection device can be considered an intermediate destination for the flow on its way to the final destination.

As discussed above, the tagged packet flow can include result information from pre-filter rules implemented at multiple network infrastructure devices before being processed at network infrastructure device 300. In some examples, different and/or additional rules are applied at one or more of those network infrastructure devices compared to previously processed network infrastructure devices.

In one example, the tags include information about the rules implemented and whether the respective rules were matched. The forwarding engine 322 can use this information and/or the pre-filter result from the logic 312 implementation to determine an intermediate destination for the packet flow. In one example, the forwarding engine 322 has access to topology information about the network. The topology information can include which network infrastructure devices implement which rules. Thus, the network infrastructure device 300 knows which pre-filter rules have been implemented, which pre-filter rules have been matched, what combinations of pre-filter rules indicate further scrutiny to be performed, and the topological locations of network infrastructure devices performing pre-filter rules, including network infrastructure devices performing additional pre-filter rules compared to the pre-filter rules already implemented and tagged to the packet flow. The forwarding engine can use this information to determine what pre-filter rule sets that have not yet been implemented on the packet flow would provide additional information as to whether the packet flow should or should not be further scrutinized. The intermediate destination is determined based on whether the intermediate destination includes the ability to implement some or all of those pre-filter rules. Moreover, the intermediate destination can be further chosen based on a path between network infrastructure device 300 and the final destination device and/or a path between the network infrastructure device 300 and a deep packet inspection device.

In some examples, the pre-filter rules providing the additional information can be associated with a particular classification (e.g., rules applying to a mail server). The packet flow may also be associated with that classification (e.g., because a source device and/or the final destination device is a mail server). The selection of the network infrastructure device to use as an intermediate destination can be done based on the classification.

In other examples, the intermediate destination can be a change of the flow from heading towards the deep packet inspection device to head towards the final destination device. For example, if the implemented rules indicate that even if additional rules are implemented, the combinations of rules would still not occur on the packet flow that would lead to a determination for further scrutiny, then the packet flow can safely be diverted towards the final destination device, which may include the intermediate destination. In some examples, when the determination is made that further rules processing would not be helpful, the packet flow can be tagged with the information (e.g., as a flag or another tag in a header). This tag/flag can be processed by other network infrastructure devices. If the tag/flag is present, the other network infrastructure devices can bypass implementing pre-filter rules on the packet flow.

In certain examples, the analysis engine 318, forwarding engine 322, tagging engine 314, and/or combinations/portions thereof can be implemented as part of the logic 312. In some examples, the logic 312 can be implemented by an ASIC (e.g., using field programmable gate arrays (FPGAs), complex programmable logic devices (CPLDs), etc.). In some examples, the logic 312 may be implemented as a set of instructions executable by processor 330.

The engines 310, 314, 318, 322 include hardware and/or combinations of hardware and programming to perform functions provided herein. Moreover, the modules (not shown) can include programming functions and/or combinations of programming functions to be executed by hardware as provided herein. When discussing the engines and modules, it is noted that functionality attributed to an engine can also be attributed to the corresponding module and vice versa. Moreover, functionality attributed to a particular module and/or engine may also be implemented using another module and/or engine.

A processor 330, such as a central processing unit (CPU) or a microprocessor suitable for retrieval and execution of instructions and/or electronic circuits can be configured to perform the functionality of any of the engines described herein. In certain scenarios, instructions and/or other information, such as topology, classifications, rules, etc., can be included in memory 332 or other memory. Moreover, in certain embodiments, some components can be utilized to implement functionality of other components described herein.

Modules (not shown) may include, for example, hardware devices including electronic circuitry for implementing the functionality described herein. In addition or as an alternative, each module may be implemented as a series of instructions encoded on a machine-readable storage medium and executable by at least one processor. It should be noted that, in some embodiments, some modules are implemented as hardware devices, while other modules are implemented as executable instructions.

Figure 5:
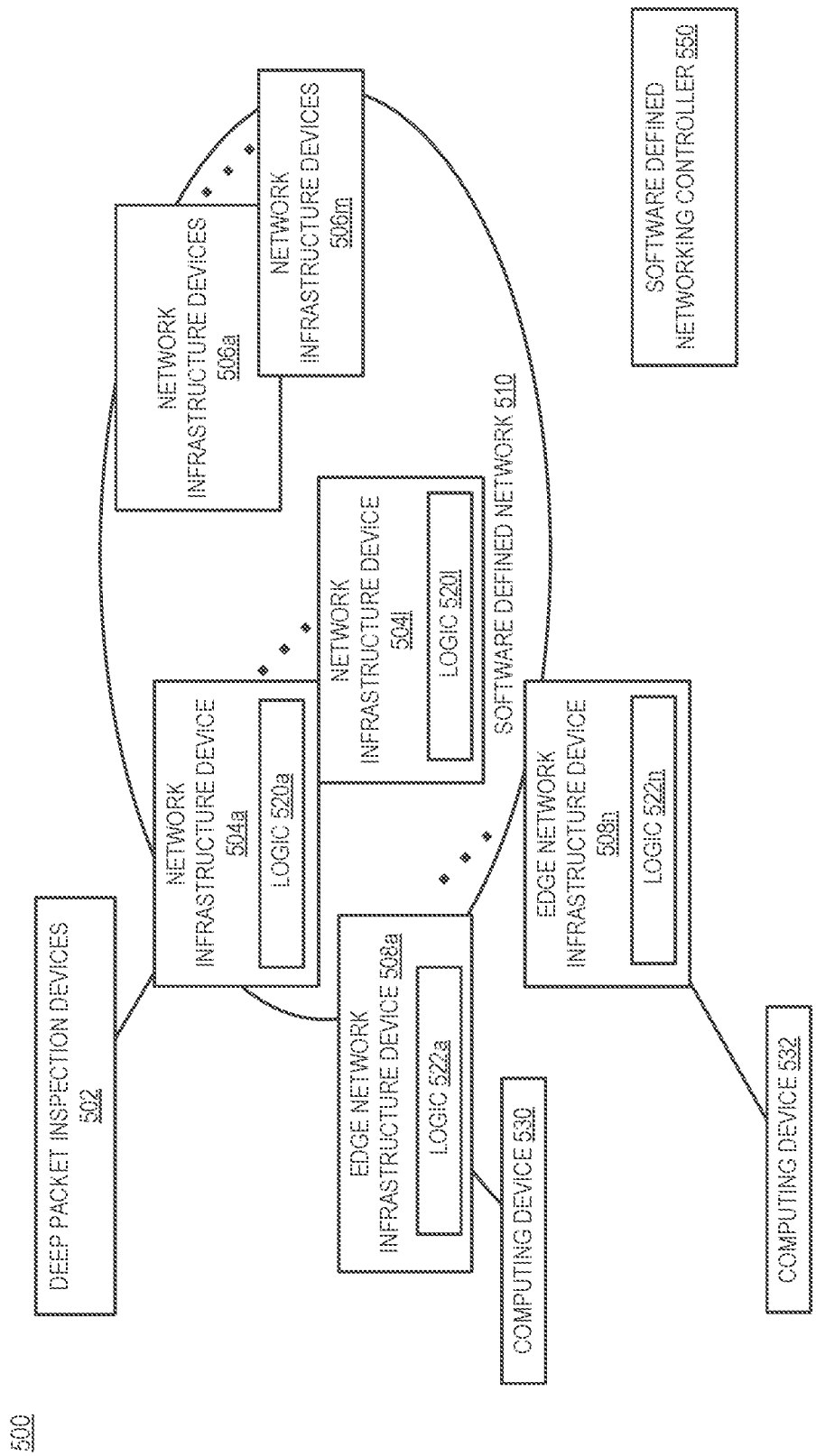
FIG. 5 is a block diagram of a network system including multiple network infrastructure devices capable of implementing pre-filter rules on packets, according to an example.

FIG. 5 is a block diagram of a network system including multiple network infrastructure devices capable of implementing pre-filter rules on packets, according to an example. The network system 500 can include a software defined network 510 that can be connected to a SDN controller 550 via a control plane and/or data plane (not shown). One or more SDN controllers can be used to control the SDN 510. The SDN 510 can be implemented using a network fabric that may include wired and wireless network elements such as network infrastructure devices 504a-504l, 506a-506m, edge network infrastructure devices 508a-508n, etc. In certain examples, a network fabric is a network topology in which devices pass data to each other via the network infrastructure devices. Network infrastructure devices 504a-504l can include logic 520a-520l to implement pre-filter rules. As noted above, the pre-filter rules can be different among different devices. Further, the SDN 510 can include other network infrastructure devices 506 that do not include the logic to implement pre-filter rules and/or devices that are not controlled by the SDN controller 550. These network infrastructure devices 506 can forward packets, including packets with tags.

Network infrastructure devices 504, 508 can include logic 520, 522 to implement respective pre-filter rules. The pre-filter rules are used to identify packets to forward to one or more deep packet inspection devices 502 implemented at the SDN 510 for further scrutiny.

As noted above, tags can be added to packet flows that represent pre-filter rules that have been implemented and the results of the implemented rules. In some examples, the SDN controller 550 can choose a first path for a packet flow, which can change based on the implementation of logic on the path from a source computing device 530 to a destination computing device 532. The first path can be chosen, for example, based on network traffic flow and/or load, the rules implemented by devices in the path, etc.

In one example, the edge network infrastructure devices 508 implement a first set of pre-filter rules that are broader and/or a prerequisite for combinations of match criteria that determines that a packet flow should be further scrutinized by a deep packet inspection device 502. In this examples, various non-edge network infrastructure devices can include logic 520 to implement other pre-filter rules. Non-edge network infrastructure devices can include network infrastructure devices 504 associated with distribution activity. Edge network infrastructure devices are network infrastructure devices that can connect to a final consumer of the packets. Non-edge nodes are network infrastructure devices that are not connected to a final consumer of the packets. Note that in some examples, a same model of network infrastructure device (e.g., a switch) can act as an edge network infrastructure device or a non-edge network infrastructure device depending on the network topology.

In this example, if no rules match at the edge network infrastructure device 508, the packet flow can be short circuited to move towards the destination computing device 532. If some rules match, a network infrastructure device 504 in the path can determine actions to implement on the packet flow (e.g., sending to deep packet inspection devices 502 for further scrutiny, sending to another network infrastructure device 504 capable of implementing particular pre-filter rules, sending on a path to the final destination, etc.) as discussed above.

In another example, the flow is initially set to go towards the deep packet inspection devices 502. In this example, the flow can go from computing device 530 to computing device 532. Some of the network infrastructure devices 504, 508, 506 can be in the path. In a simple example, edge network infrastructure device 508a implements rules {A, B, C}, another network infrastructure device 504a in the path implements rules {D, E, F}. In this example, the following rule combinations can indicate that further scrutiny should be conducted by a deep packet inspection device 502 {AB, BF, CD}.

In one example, the flow matches rules B and C at edge network infrastructure device 508a, is tagged, and goes to network infrastructure device 504a on its path to a deep packet inspection device 502. In one example, network infrastructure device 504a can match rule D. In this example, the information is tagged to the flow and the flow is sent to the deep packet inspection devices 502 because the flow matches rules C and D.

In one example, the flow matches rules B and C at edge network infrastructure device 508a, is tagged, and goes to network infrastructure device 504a on its path to a deep packet inspection device 502. In this example, network infrastructure device 504a can match rule E or not match any additional rules from matched rules B and C. Further, in this example, the information can be tagged to the flow and the flow can be redirected to the computing device 532 because match criteria indicating that deep packet inspection should be performed on the flow cannot be fulfilled.

Figure 6:
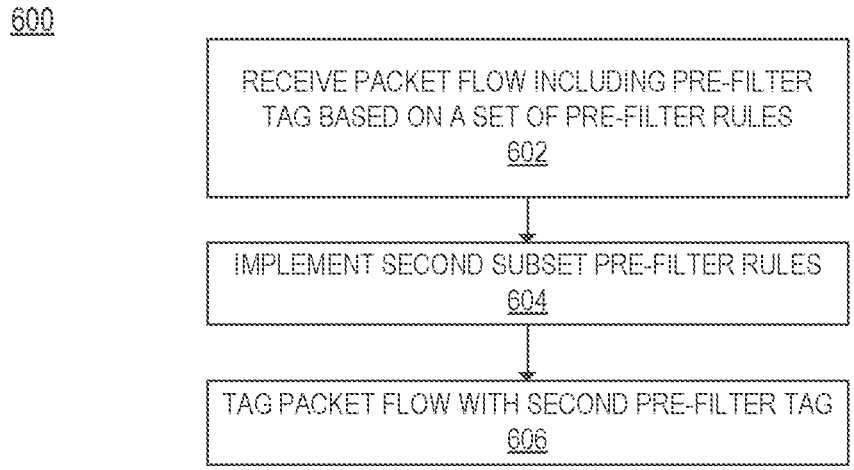
FIG. 6 is a flowchart of a method for tagging a packet flow with a pre-filter tag, according to an example.
Figure 7:
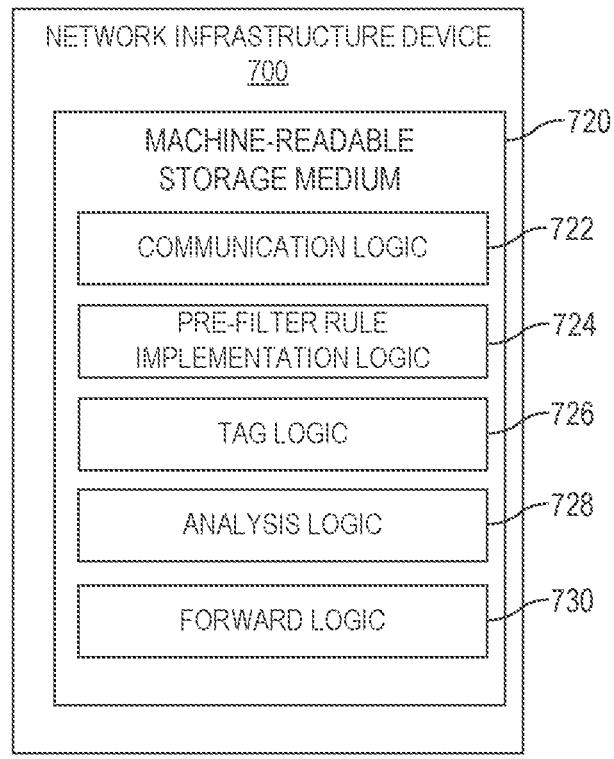
FIG. 7 is a block diagram of a network infrastructure devices capable of tagging implemented pre-filter rules, according to an example.

FIG. 6 is a flowchart of a method for tagging a packet flow with a pre-filter tag, according to an example. FIG. 7 is a block diagram of a network infrastructure devices capable of tagging implemented pre-filter rules, according to an example. Although execution of method 600 is described below with reference to computing device 700, other suitable components for execution of method 600 can be utilized (e.g., network infrastructure device 300). Method 600 may be implemented by logic in the form of executable instructions stored on a machine-readable storage medium, such as storage medium 720, and executable by one or more processor, in the form of electronic circuitry, such as one or more ASICs, or some combination thereof. Machine-readable storage medium 720 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory.

Communication logic 722 can be used to implement communications between the network infrastructure device 700 and other devices. Further, the network infrastructure device 700 can include pre-filter rule implementation logic 724 to implement a subset of pre-filter rules and tag logic 726 that can tag a packet flow with a pre-filter result. Analysis logic 728 can be used to analyze results of pre-filter rule implementation. Moreover, forward logic 730 can be implemented to determine a destination of the packet flow.

At 602, the communication logic 722 receives a packet flow including one or more pre-filter tags including information from implementation of a one or more subsets of a complete set of pre-filter rules. The subset(s) can be different from the subset implemented by the pre-filter rule implementation logic 724. For example, the subset implemented (604) at the implementation logic 724 may include additional rules compared to the previously implemented rules. The pre-filter rule implementation logic 724 can be used to implement the subset of pre-filter rules available at the network infrastructure device 700 to yield a pre-filter result. At 606, the tag logic 726 can add the pre-filter result to the packet flow as a tag (e.g., in the form of metadata). The pre-filter result can be added in addition to the one or more pre-filter tags and/or can replace the one or more pre-filter tags and include the results from the previous pre-filter tag(s).

The analysis logic 728 can be implemented to analyze the pre-filter tag(s) and pre-filter result. The analysis can determine whether the packet flow should be further scrutinized by a deep packet inspection device located on a network, such as a campus network that the network infrastructure device 700 belongs to. As noted above, the determination can be based on whether a rule or a combination of rules that are matched signify that further scrutiny should be applied.

If the determination is that further scrutiny should be applied, the forward logic 730 can forward the packet flow's path towards the deep packet inspection device. In some examples, a tag can be added to the packet flow to indicate that the flow should go to the deep packet inspection device.

If the determination is that further scrutiny need not be applied (e.g., because the combinations of rules that signify that further scrutiny cannot be met), the packet flow can be diverted directly towards the final destination of the flow. As such, in some examples, the forward logic 730 can change the path of the packet flow from proceeding towards the deep packet inspection device to proceeding towards the final destination of the packet flow.

If the determination is that further analysis should be conducted before sending to the final destination and/or a deep packet inspection device for further scrutiny, further analysis can be completed. For example, the forward logic 730 can determine possible flow paths to the destination and/or deep packet inspection device(s). Further, the forward logic 730 can determine what rule sets can be implemented for the packet flow that would provide a useful answer of whether further scrutiny should be applied (e.g., which rule sets, if matched, would lead to further scrutiny). The flow path can be directed through network infrastructure devices that implement one or more of the rule sets. The forward logic 730 can then forward the packet flow to the next selected device on the flow path.

What is claimed is:

1. A network infrastructure device comprising:
an interface engine to receive a packet flow including a first pre-filter tag appended by another network infrastructure device, the first pre-filter tag including information from implementation of a first subset of pre-filter rules selected from a set of pre-filter rules; and
logic to implement a second subset of the set of the pre-filter rules on the packet flow to yield a pre-filter result,
wherein the second subset of pre-filter rules are different from the first subset of pre-filter rules
a tagging engine to tag the packet flow with a second pre-filter tag including the pre-filter result; and
a forwarding engine to determine an intermediate destination for the packet flow based on the first pre-filter tag and the pre-filter result.

2. The network infrastructure device of claim 1, wherein the network infrastructure device is to be part of a campus network that includes a plurality of other network infrastructure devices, wherein the packet flow is received from a first one of the other network infrastructure devices.

3. The network infrastructure device of claim 2, wherein the intermediate destination is a third network infrastructure device implementing a third subset of pre-filter rules including additional pre-filter rules compared to the first subset and the second subset and wherein the forwarding engine selects the third network infrastructure device based on the additional pre-filter rules.

4. The network infrastructure device of claim 3, wherein the third subset of pre-filter rules are associated with a classification, wherein the packet flow is also associated with the classification.

5. The network infrastructure device of claim 2, further comprising:
an analysis engine to analyze the first pre-filter tag and the pre-filter result to determine that the packet flow is to be further scrutinized by a deep packet inspection device,
wherein the intermediate destination is determined to be the deep packet inspection device based on the determination for further scrutinization.

6. The network infrastructure device of claim 5, wherein the packet flow is further tagged with a third pre-filter tag including other information from implementation of a third subset of the pre-filter rules wherein the third subset includes additional pre-filter rules compared to the first subset and the second subset, and
wherein the determination that the packet flow is to be further scrutinized is further based on the third pre-filter tag.

7. A method comprising: receiving, at a network infrastructure device, a packet flow including a first pre-filter tag appended by another network infrastructure device, the first pre-filter tag including information from implementation of a first subset of a set of pre-filter rules,
wherein the network infrastructure device includes logic to implement a second subset of the pre-filter rules, and wherein the second subset of pre-filter rules are different from the first subset of pre-filter rules;
implementing, by the logic, the second subset of pre-filter rules on the packet flow to yield a pre-filter result;
tagging, by the network infrastructure device, the packet flow to include the pre-filter result as a second pre-filter tag; and
determining, by the network infrastructure device, an intermediate destination for the packet flow based on the first pre-filter tag and the pre-filter result.

8. The method of claim 7, further comprising:
analyzing, by the network infrastructure device, the first pre-filter tag and the pre-filter result to determine that the packet flow should be further scrutinized by a deep packet inspection device of a campus network, wherein the intermediate destination is determined to be the deep packet inspection device based on the determination for further scrutinization; and
forwarding, by the network infrastructure device, the packet flow to the deep packet inspection device.

9. The method of claim 8, wherein the packet flow is further tagged with a third pre-filter tag including other information from implementation of a third subset of the pre-filter rules,
wherein the third subset includes additional pre-filter rules compared to the first subset and the second subset, and
wherein the determination that the packet flow is to be further scrutinized is further based on the third pre-filter tag.

10. The method of claim 7, wherein the network infrastructure device is a part of a network that includes a plurality of network infrastructure devices, wherein the packet flow is received from a first one of the network infrastructure devices.

11. The method of claim 10, further comprising:
determining, by the network infrastructure device, a third subset of pre-filter rules relevant to the packet flow based on the first pre-filter tag and the pre-filter result; and
selecting a second one of the network infrastructure devices that is in a path to a final destination of the packet flow that implements the third subset of pre-filter rules.

12. The method of claim 11, further comprising:
forwarding the packet flow to the second one network infrastructure device based on the selection of the second one network infrastructure device.

13. A non-transitory machine-readable storage medium including logic to cause a network infrastructure device to:
receive a packet flow including a first pre-filter tag appended by another network infrastructure device, the first pre-filter tag including information from implementation of a first subset of pre-filter rules associated with network edge activity,
implement a second subset of the pre-filter rules on the packet flow to yield a pre-filter result,
wherein the second subset is different from the first subset and is associated with non-edge network activity;
tag the packet flow to include the pre-filter result as a second pre-filter tag; and
determine, by the network infrastructure device, an intermediate destination for the packet flow based on the first pre-filter tag and the pre-filter result.

14. The non-transitory machine-readable storage medium of claim 13, wherein the logic includes at least one of: an application specific integrated circuit and instructions to be executed by at least one processor.

15. The non-transitory machine-readable storage medium of claim 13, wherein the network infrastructure device is to be part of a campus network that includes a plurality of other network infrastructure devices, wherein the packet flow is received from a first one of the other network infrastructure devices.

16. The non-transitory machine-readable storage medium of claim 13, wherein the logic further causes the network infrastructure device to change a path of the packet flow from proceeding towards a deep packet inspection device to proceeding towards a final destination of the packet flow via the intermediate destination.

* * * * *